United States Patent

[11] 3,573,373

[72] Inventors Francis J. Mullin
Baltimore;
Raymond B. Ramsey, Towson; Christian
Scholly, Baltimore, Md.
[21] Appl. No. 714,994
[22] Filed Mar. 21, 1968
[45] Patented Apr. 6, 1971
[73] Assignee Bell Telephone Laboratories Incorporated
Murray Hill, N.J.

[54] CABLE TERMINATING SYSTEM FOR KEY TELEPHONE CLOSETS
4 Claims, 5 Drawing Figs.

[52] U.S. Cl. .......... 179/98, 174/72, 317/122
[51] Int. Cl. .......... H04g 1/14
[50] Field of Search .......... 179/98; 317/122; 174/72A

[56] References Cited
UNITED STATES PATENTS
1,639,310 8/1927 Richardson .......... 174/72UX
2,233,107 2/1941 Miller .......... 179/98
FOREIGN PATENTS
972,773 10/1964 Great Britain .......... 174/72AUX

*Primary Examiner*—Kathleen H. Claffy
*Assistant Examiner*—Jan S. Black
*Attorneys*—R. J. Guenther and Edwin B. Cave

ABSTRACT: A building-block approach to terminal arrangements in a key telephone station closet is described in which the connector blocks are mounted in functional groups. Each group is expandable within the closet by virtue of factory-provided boards equipped with prepositioned mounting brackets for the blocks. The board size and bracket spacing is such that jumper wires are led either vertically or horizontally between the brackets with the aid of open finger guides instead of rings. Lead-in cable is run beneath the connector block brackets, leaving the space between blocks exclusively for jumper leads.

INVENTORS F. J. MULLIN
R. B. RAMSEY
C. SCHOLLY
BY
ATTORNEY

CABLE TERMINATING SYSTEM FOR KEY TELEPHONE CLOSETS

This invention relates to wiring arrangements in key telephone system closets and more specifically to a method of, and apparatus for, effecting a standardized and systematized layout for connector blocks, lead-in cable and jumper wires.

BACKGROUND OF THE INVENTION

Key telephone closets are the interconnection point of the telephones of one or more key telephone systems with each other as well as with the servicing telephone lines. A great number of interconnections are made between and among the several terminal arrays which functionally serve the stations, the telephone line terminations and the key unit. Also requiring interconnections in most key systems are the special service features such as busy lamp, dial intercom, local buzzer, common audible and others. Often more than one entire key telephone system is serviced from a single closet; and in a large modern office building several closets are needed for each floor. A large number of key telephone closets are already in service; and new closets are being installed each year in increasing numbers.

It is apparent from the above description, and it is well known to telephone service personnel, that the problem of wire congestion in key telephone closets is increasingly severe. Although the connector blocks are generally mounted in functional groups and vertical arrays, the cross-connecting field as it builds up often becomes a confusing tangle of wires. Pair identification under these conditions is extremely time consuming; and for the same reason, reassignment of cable pairs is difficult.

Additionally, much more wall space than really necessary is consumed by the present termination apparatus. The latter is also expensive and much of it is dedicated in the closet in advance of its actual need. The original installation requires carpentry work of the installer in the aligning and fastening of the terminal blocks to the backboard.

Moreover, the closed distributing rings used as guides for jumper wire make it necessary during rearrangements to remove the jumper wire by its end.

Accordingly, one object of the invention is to reduce the cost of installing and maintaining key telephone closets.

Another object of the invention is to reduce the labor required to wire and rearrange connections in a key telephone closet.

A specific object of the invention is to simplify the initial installation of connector terminals and their associated jumper leads in key telephone closets.

A further object of the invention is to reduce the clutter of wires in the jumper lead path.

SUMMARY OF THE INVENTION

The primary inventive concept which alleviates the above problems involves a standardized arrangement of terminal blocks in functional groups on size-coordinated backboard modules. Advantageously, the backboards are equipped with factory-mounted brackets, each of which snap mounts a connector block. The functional groups are made up of several such backboards with snap-mountable, removable connector blocks. The backboard sizes, bracket spacing and connector block lengths are such that, as the closet is built up with backboard modules, the connector blocks fall in continuous vertical lines; and corridors occur between the main groups and also between adjacent rows of blocks.

The corridors and their spacing are defined in part by the positioning and spacing of the backboard brackets, which is effected at the factory. The backboards are modules in a building block system which allows an installer to tailor-make each closet and to provide for orderly expansion and growth of the closet.

In addition to their prepositioned brackets, certain of the backboards also include prepositioned tapered finger guides which serve to lead the jumper wire from one corridor into an intersecting corridor. These finger guides contrast with the earlier used ring guides in two respects. First, during rearrangements the jumper wires simply are lifted away from the fingers whereas the wires must be pulled completely out of the ring guides. Secondly, by virtue of their prepositioning on their backboards, the finger guides are automatically located at the corridor intersections as these backboards are assembled in the closet.

The described mounting bracket is further characterized by an interior passage which contains and isolates the lead-in cables. This further aspect of the invention creates cable runs which are continued from one backboard to its neighbor as the closet is built up. The space between brackets thus is made available exclusively for the jumper leads, which greatly simplifies jumper tracing. As described in further detail in the copending application, Ser. No. 714,995, filed Mar. 21, 1968, and assigned to applicants' assignee, this type of connector block bracket has useful applications independent of its use in the modular building block concept of the present invention.

A detailed understanding of the invention, its further objects, features and advantages may be gained from a reading of the description to follow of an illustrative embodiment thereof.

DETAILED DESCRIPTION OF AN ILLUSTRATIVE EMBODIMENT

Figure 1:
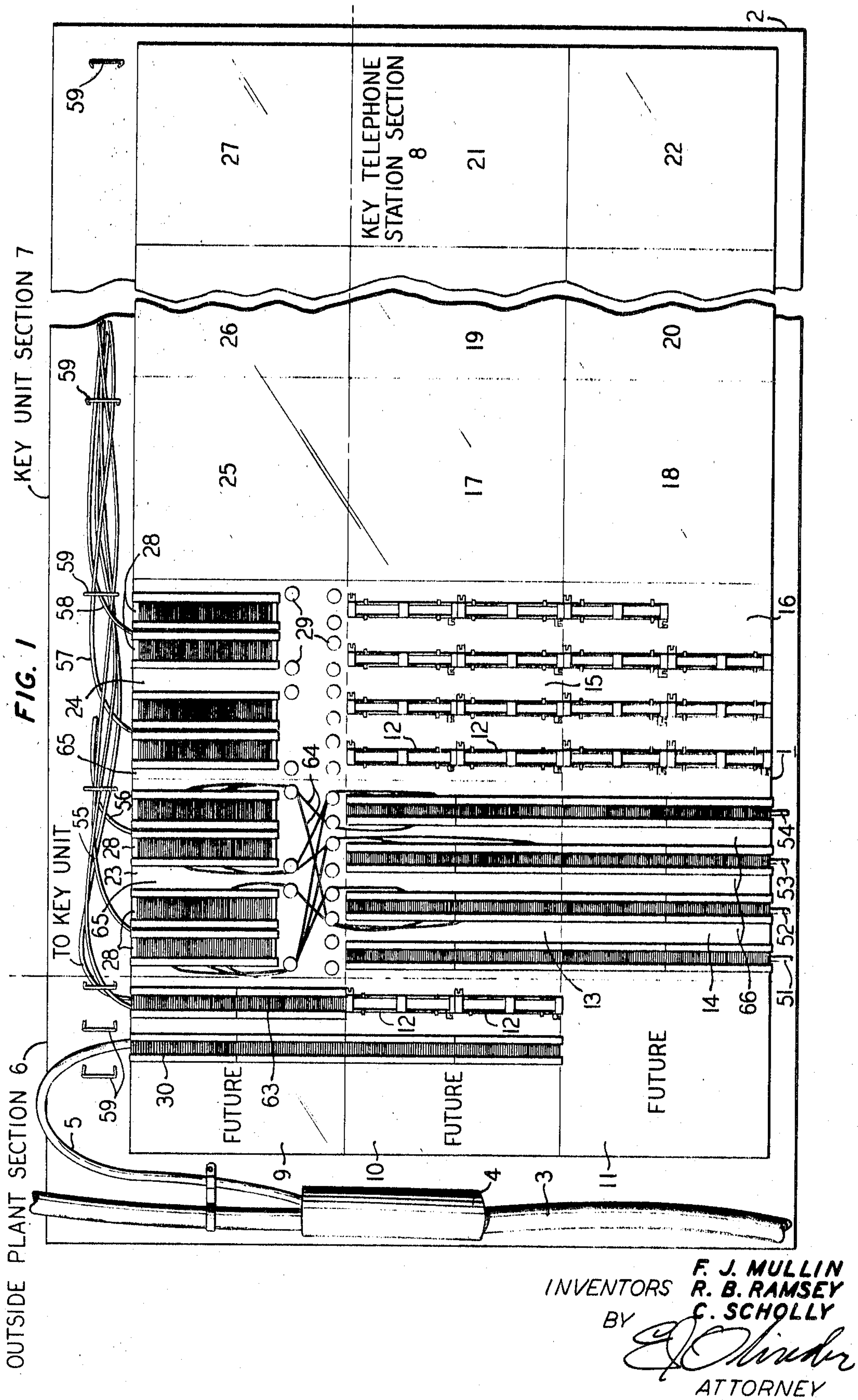
FIG. 1 is a schematic illustration of one wall of a key station closet.

A typical environment in which the present invention is employed is depicted in FIG. 1 which shows schematically one wall of a key telephone station closet. Although but one wall is shown, it will be clear that the inventive concept is equally and perhaps particularly applicable to closets in which two, three or even four walls must be used for mounting of terminal blocks. The closet, designated with the numeral 1, might typically be a centrally located office building floor closet containing the outside plant terminations, the key telephone units, power supplies, and station cables.

Usually, although not always, each closet wall to be used as terminal mounting is first covered with a plywood backing such as 2 which serves as a convenient surface to which to fasten the backboard modules to be described. The closet is fed by a riser cable 3 or other similar cable which contains conductor pairs which are line connections to a central office. Those conductors of cable 3 which are to be associated with the particular key telephone units serviced by the closet are disassociated from the riser cable through a splice case 4 and led via a feeder cable 5 to a section, designated 6, of the closet wall.

Wall closet section 6 is one of at least three wall sections which in accordance with the invention are purposefully reserved to accommodate a specific backboard and connector block configuration. The connector terminals to be included in each section service a specific portion of the key terminal system. For example, the terminal blocks of section 6 afford a means for effecting a multiple appearance of each of the telephone lines contained in feeder cable 5. Section 7, which is distinguished from section 6 by the vertical broken line in FIG. 1, contains the terminal blocks which service the key telephone unit or units. Section 8, which is the area below the horizontal broken line and to the right of the vertical broken line in FIG. 1, is reserved for terminal blocks which service the telephone stations. As will become more evident in the following paragraphs, it is important to the inventive concept that a given wall or walls in a key station closet be broadly subdivided into functional sections; and that the sections be contiguous as illustrated.

A primary facet of the invention involves the employment of backboard modules, each of a specific design depending upon the section which they are to serve. In section 6, for example, three backboards 9, 10 and 11 are vertically disposed within the section and screwed to plywood 2. Advantageously, each of the backboards 9, 10, 11 are equipped at the factory with one or more elongated brackets of the type illustrated in FIG. 2. These brackets, designated 12, are each broadly characterized by two features: first, a means for snap-mounting connector blocks onto the bracket; and second, an unobstructed interior passage from one end to the other.

It has been found convenient to establish the length of bracket 12 so that two such brackets placed end to end, as illustrated in backboard 10, will substantially span the height of backboard 10. It should be understood, however, that any number of brackets may be employed provided that their aggregate length substantially equals the height of the backboard on which they are mounted; and further, that they are characterized by the above-noted two features.

Advantageously, although not necessarily, the backboards 9, 10, 11 are in the form of squares and are constructed of a fire-retardant wooden panel. Merely by way of example, typical dimensions of backboard 9 are 17 inches wide by 20 inches long by one-half inch thick. Each board is equipped with mounting holes (not shown) in the four corners, permitting installation with standard No. 8 screws.

From one to four vertical rows of brackets 12 are positioned with a predetermined spacing on each of the backboards 9, 10 and 11. Advantageously, the brackets 12 are installed at the factor to assure correct spacing and positioning, and to relieve the installer of carpentry. Where less than the entire area of backboards 9, 10, 11 are needed for mounting of connector blocks, only certain of the brackets are installed on the boards leaving the remainder of the space free for future expansion of the outside plant section 6 as illustrated in FIG. 1.

The backboards and bracket modules designed for use in section 8, i.e., the key telephone station section, are substantially the same in construction as the backboards 9, 10, 11. These backboards, which are designated with the numerals 13 through 22, respectively, are also equipped, preferably at the factory, with brackets 12 of the type earlier characterized. In accordance with the modular concept of the invention, each of the boards 13 through 22 is of the same height as the boards 9 through 11.

Figure 3:
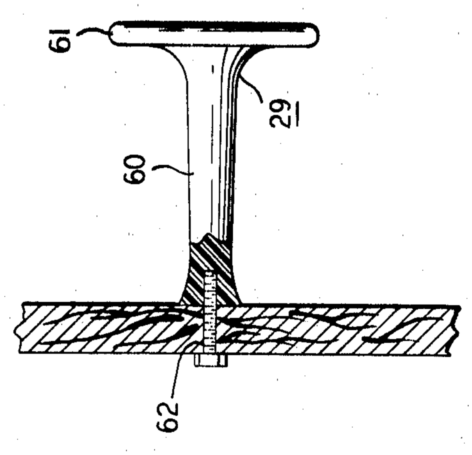
FIG. 3 is a side view of one embodiment of the guide.

The backboards which occupy the space in section 7, the key unit section, differ in certain respects from the previously described backboards. Each of the section 7 backboards, which are designated by the numerals 23 through 27, is equipped, preferably at the factory, with a number of guides 29 shaped substantially as shown in FIG. 3. As seen in FIG. 1 and in FIG. 5, the guides on boards 23 and 24, for example, are stationed in a predetermined array such that when the boards 23, 24 are incorporated into the scheme of FIG. 1, a guide will be diagonally adjacent each of the end corners of the brackets 12 whose upper ends are the boards 23, 24.

Since as a practical matter the terminal block appearances of the lines from the key unit are fixed in nature and do not require rearrangements, it is advantageous to utilize connector blocks such as 28 which are screw-fastened to the boards 23 through 27. It nevertheless may be desirable in certain cases to provide mounting brackets, such as 12, with the boards 23 through 27 so that blocks 28 can be snap mounted therein. In the instant example, however, connector blocks 28 are screwed directly onto their backboards preferably at the factory and in a predetermined pattern such that, as with board 23, two blocks 28 abut each other on the left side and two blocks 28 abut each other on the right side of board 23.

Figure 5:
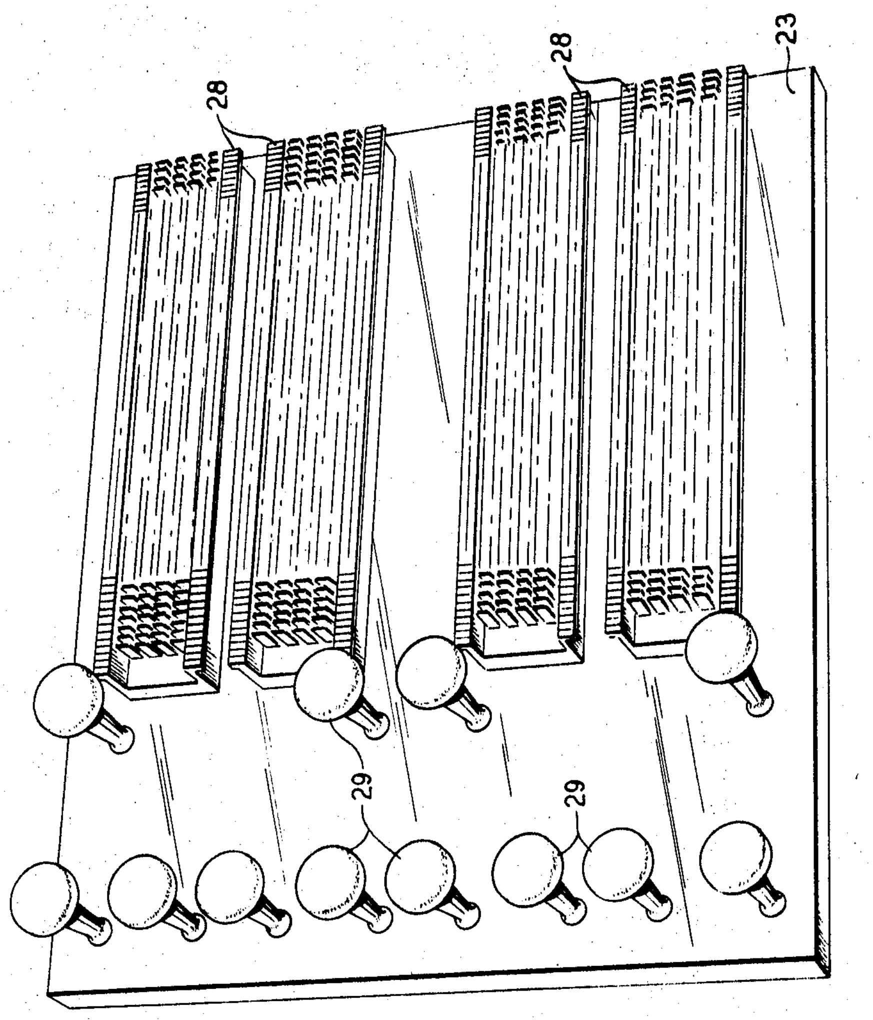
FIG. 5 is a perspective view of a guide backboard.

The length of each block 28 is such that when blocks 28 are mounted with their top ends flush with the top end of board 23, a relatively large space remains at the bottom of board 23 through 28. This space, as shown in FIG. 5, provides a wide horizontal through-corridor between key unit section 7 and key telephone station section 8. It is in this corridor, created by adjacency of boards 23 through 27, that the guide pins 29 are located.

Figure 2:
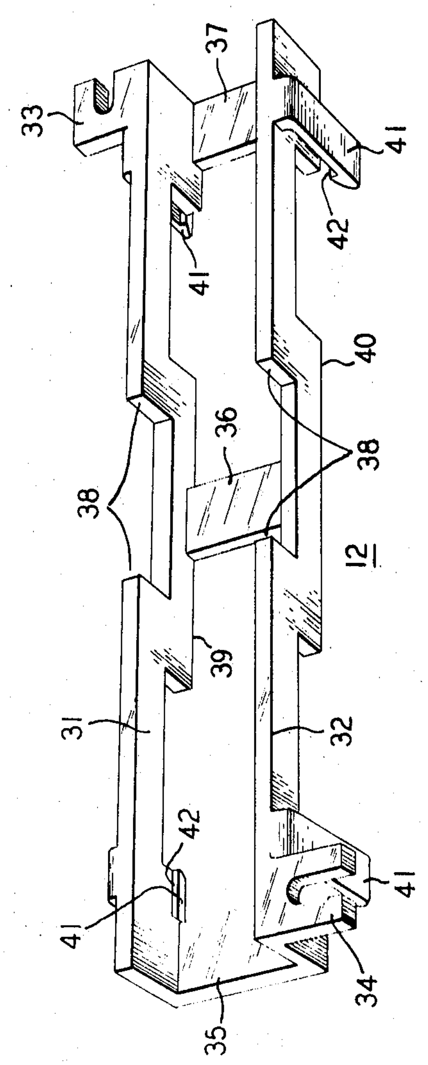
FIG. 2 is a bottom perspective view of one embodiment of the bracket.
Figure 4:
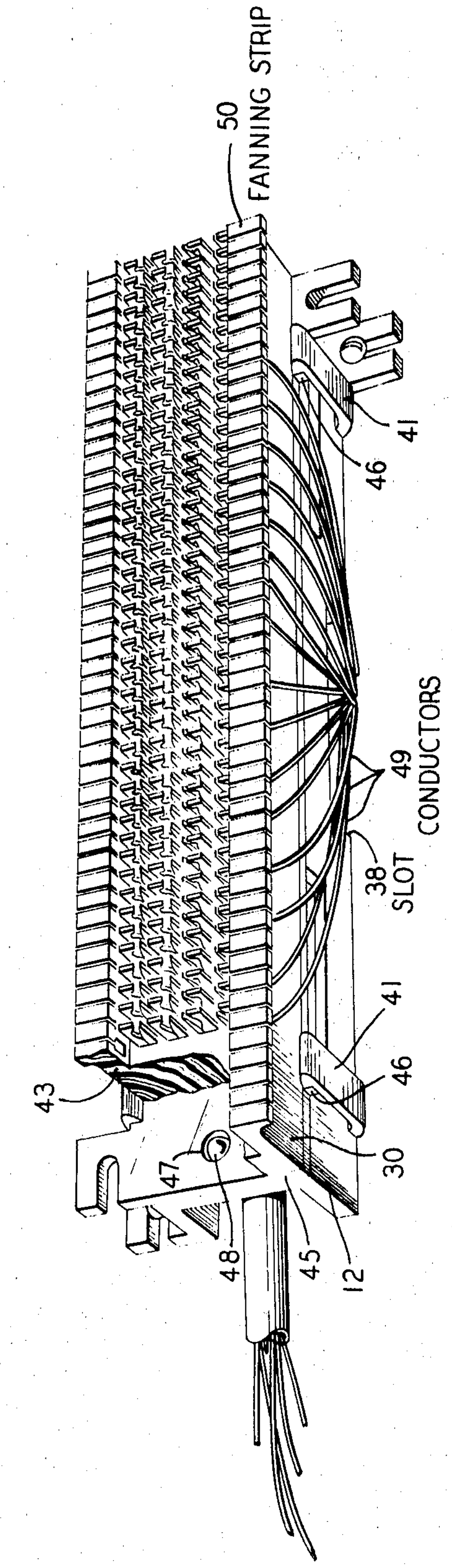
FIG. 4 is a top perspective view of the bracket and block assembly.

The cooperation of bracket 12 with the blocks 30 specifically designed to mount thereto will now be described with the aid of FIGS. 2 and 4. Bracket 12 advantageously is a unitary one-piece molded plastic item having parallel sides 31, 32, and a planar back which includes slotted tabs 33, 34. The sides 31, 32 are joined by three sections 35, 36, 37. At about the center point of sides 31, 32 there occurs a slotted section which represents a break in the continuity of sides 31, 32. The opposite surface of the slotted portion 38 of sides 31, 32 are raised portions 39, 40. The top surface of sections 35, 36, 37 and of raised portions 39, 40 constitute a planar surface.

Extending from each end of the respective sides 31, 32 are arms 41 each with a hook 42. The hooks 42 are separated from the aforementioned planar surface by equal predetermined amounts. The upper inside surface of each arm 41 is tapered inwardly.

At the factory the brackets 12 are assembled on the boards, such as 9 through 11 and 13 through 22, in a manner as described, using wood screws or other suitable fasteners in the slotted tabs 33, 34. A connector block, such as 43 shown in FIG. 4, which is to be accommodated in bracket 12 includes a backing plate 45 with tab extensions 46 located for engagement with the resilient arms 41. Backing plate 45 also includes lineup holes 47 which engage with lineup pins 48 that are molded integrally with sections 35, 36, 37 of bracket 12.

ASSEMBLY OF A CLOSET

After the plywood 2 is affixed to the closet wall an installer fastens one or more backing boards such as 9 and 10 to the plywood in the positions shown in FIG. 1. Thereafter, he screws a desired number of boards such as 23 into place such that their bottom edges are common with the bottom edge of board 9, and all boards are flush against each other at their meeting edges. Then, the installer screws in place a number of boards such as 13 through 16 so that their top edges are flush with the respective bottom edges of boards 23, 24. As all of the brackets are already in place on boards 9, 10 and 13 through 16, the installer next snap mounts the required number of connector blocks 30 into place in the brackets 12. Advantageously, he need only install as many blocks, such as 30, as the wiring requires, leaving certain of the brackets 12 empty for future expansion.

The feeder cable 5 is down between the sides of the vertical column of brackets 12; and each of the telephone conductors is terminated through a given set of terminals in one of the connector blocks. As seen in FIG. 4, the individual conductors, designated generally as 49, are led from the slot 38 in the side of bracket 12 and into their respective slots in the fanning strip 50 of connector block 30.

In a similar fashion, the cables, such as 51 through 54, which lead into the closet from the various key telephone stations being serviced, are fed into the bottom entrance of the cable run defined by the end-to-end mounted brackets 12 in boards 13 and 16. Cables 51 through 54, and all of the other key telephone station cables are led through the cable runs and fanned out into connections with the connector blocks 30 in the manner shown in FIG. 4.

The key unit cables, designated 55 through 58, which lead to the closet from the key-switching unit (not shown) are each advantageously led between a respective pair of connector blocks 28 through a fanning strip (not shown) and with the conductor pairs therein terminated in routine fashion on the blocks 28.

It is of course understood that all the boards shown as unoccupied in FIG. 1 can have the described termination apparatus installed on them, depending on the needs of a given installation; and that their omission in the instant example is merely to show the mode of future expansion contemplated by the invention.

It should also be understood that the sections so far mentioned, namely, the outside plant, key unit and key telephone station sections are often augmented by a fourth section which accommodates the earlier noted special service features. The accommodation of special service features, although not shown in the instant embodiment, is identical in structure to the boards 23, 13, and 14 as shown in FIG. 1 with their described apparatus.

The cables 55 through 58, since they and the blocks 28 to which connected are relatively permanent installations, are led through conventional guide rings 59 which are positioned on the plywood into the wall conveniently above the entire array of connector blocks.

A primary advantage of the invention involves the flexibility afforded by the finger guides 29. These each consist of a smooth tapered shank section 60 and a cap 61. Each guide 29 is affixed to its respective board by suitable means such as screw 62.

The remainder of the connections which complete the closet involve a multitude of jumper leads 64. To retain the clarity of FIG. 1 only a very few of these leads are shown. Numerous such jumper leads run, for example, from the terminals 30 to which the conductors of feeder cable 5 are connected, via the nearby ring loops 59, to the key unit input terminals 63. Then, numerous individual jumper leads will run from each of the blocks 28 in key unit section 7, and each lead will terminate in a specific field of one of the terminal connector blocks 30 in key telephone station section 8.

Howsoever a given jumper lead 64 is connected, the invention assures that it will undergo no more than two bends. Further, the lead almost always can be rearranged merely by lifting it away from the guides 29 with which it is in contact, without having to disturb any other wires abutting the same guide.

The wide corridor provided between the connector blocks in section 8 and those in section 7 affords ample space to accommodate the intertwining jumper leads 64. Similarly, the corridors 65 between connector blocks 28 are, by virtue of the inventive arrangement, also free of all wires other than jumper leads. Moreover, as the station cables 51 through 54 are completely contained within their cable runs defined by the mounting brackets 12, the corridors 66 between the bracket arrays in section 8 are also free of extraneous wires and cables.

It is to be understood that the embodiments described herein are merely illustrative of the principles of the invention. Various modifications may be made thereto by persons skilled in the art without departing from the spirit and scope of the invention.

We claim:

1. In a key telephone system, apparatus for interconnecting the associated key unit cables, telephone station cables and feeder cables, comprising:

a generally rectangular vertical surface comprising at least three contiguous sections including:

a feeder cable section;

a key telephone section; and a key unit section;

each section having an exterior edge;

said feeder cable section and key telephone section each containing one or more backboards, each backboard comprising:

at least one elongated bracket having an exterior surface, means for snap mounting one or more connector blocks onto said exterior surface, and a pair of side legs including first and second slotted tabs associated respectively with said legs for receiving a fastener to said backboard, said side legs defining a relatively enclosed continuous interior passage, one or more connector blocks associated with each bracket, each block including means for engaging a bracket snap mounting means;

said key unit section containing one or more backboards each comprising:

one or more elongated connector blocks fastened to said backboard and a free corridor for jumper wires between the key unit backboard interior edge and the interior edge of the last-named connector blocks;

the key unit and key telephone backboards having like rectangular shapes and a common linear interface to which all said brackets as well as the key unit blocks are substantially perpendicular; and means for leading all said feeder cables and said station cables into and through their respective bracket interior passages, thereby to confine said cables and avoid their interfering with jumper wires.

2. A system in accordance with claim 1, wherein each said corridor contains a plurality of guideposts, with one such post being stationed diagonally adjacent each connector block corner contiguous to said corridor, and each post comprising an outwardly tapering shank and a cap; the posts serving as guides for jumper wire.

3. A system in accordance with claim 2 wherein each said telephone station backboard comprises four equally spaced columns of two brackets each, arranged end to end with the outermost bracket ends being contiguous with the backboard edges, two such boards when placed end to end thereby effecting a connection of station cable passages therebetween.

4. A system in accordance with claim 2 wherein said bracket snap-mounting means comprises first and second resilient arm pairs at each bracket end and extending beyond said exterior surface, each arm having an inwardly beveled end and a catch beneath the bevel; and wherein said block-engaging means comprises a base with tab extensions spaced to spread said arm pairs upon insertion of said block into said arms, said tabs engaging said catches when said block base contacts said bracket exterior surface.